US008839683B2

(12) United States Patent
Sabarinathan et al.

(10) Patent No.: US 8,839,683 B2
(45) Date of Patent: Sep. 23, 2014

(54) PHOTONIC CRYSTAL PRESSURE SENSOR

(75) Inventors: Jayshri Sabarinathan, London (CA); Aref Bakhtazad, London (CA); Xuan Huo, Toronto (CA); Jeff Hutter, London (CA)

(73) Assignee: The University of Western Ontario, London, ON (CA)

( * ) Notice: Subject to any disclaimer, the term of this patent is extended or adjusted under 35 U.S.C. 154(b) by 343 days.

(21) Appl. No.: 13/266,251

(22) PCT Filed: May 3, 2010

(86) PCT No.: PCT/CA2010/000693
§ 371 (c)(1),
(2), (4) Date: Jan. 9, 2012

(87) PCT Pub. No.: WO2010/124400
PCT Pub. Date: Nov. 4, 2010

(65) Prior Publication Data
US 2012/0096956 A1 Apr. 26, 2012

Related U.S. Application Data

(60) Provisional application No. 61/213,050, filed on May 1, 2009.

(51) Int. Cl.
*G01L 9/00* (2006.01)
(52) U.S. Cl.
CPC .................................. *G01L 9/0076* (2013.01)
USPC .................................................. 73/862.541
(58) Field of Classification Search
USPC .................................................. 73/862.541
See application file for complete search history.

(56) References Cited

U.S. PATENT DOCUMENTS

| 3,858,097 | A | * | 12/1974 | Polye | 361/283.1 |
| 4,542,436 | A | * | 9/1985 | Carusillo | 361/283.4 |
| 6,564,643 | B1 | * | 5/2003 | Horie et al. | 73/724 |
| 7,963,170 | B2 | * | 6/2011 | Kramer et al. | 73/736 |
| 2012/0064655 | A1 | * | 3/2012 | Quick et al. | 438/49 |
| 2013/0152694 | A1 | * | 6/2013 | Urvas et al. | 73/724 |

OTHER PUBLICATIONS

Biallo et al, "High sensitivity photonic crystal pressure sensor", Journal of the European Optical Society, Rapid Publications 2, 07017, May 22, 2007.
Chow et al, "Ultra compact biochemical sensor built with two-dimensional photonic crystal microcavity", Optics Letters, vol. 29, pp. 1093-1095, 2004.
Lee et al, "Design and Modeling of a Nanomechanical Sensor Using Silicon Photonic Crystals", Journal of Lightwave Technology, vol. 26, Issue 7, pp. 839-846, Apr. 1, 2008.

* cited by examiner

*Primary Examiner* — Freddie Kirkland, III
(74) *Attorney, Agent, or Firm* — Hill & Schumacher

(57) ABSTRACT

The present invention provides a microscale pressure sensor that exhibits high sensitivity in a small form factor. The sensor is a bridged device in which a photonic crystal waveguide, surrounded by a photonic crystal slab, is suspended over a dielectric substrate. Under applied pressure, the photonic crystal waveguide is deflected toward the substrate, causing a decrease in optical transmission across the waveguide due to the coupling of the evanescent field of the guided mode to the dielectric substrate. In a preferred embodiment, the waveguide is coupled to a photonic crystal microcavity, which increases evanescent coupling.

36 Claims, 7 Drawing Sheets

PHOTONIC CRYSTAL PRESSURE SENSOR

CROSS-REFERENCE TO RELATED APPLICATION

This application is a National Phase application claiming the benefit of PCT/CA2010/000693 filed on May 3,2010, in English, which further claims priority to U.S. Provisional Application No. 61/213,050, titled "PHOTONIC CRYSTAL PRESSURE SENSOR" and filed on May 1, 2009, the entire contents of which are incorporated herein by reference.

FIELD OF THE INVENTION

The present invention relates to pressure sensors. More particularly, the present invention relates to microscale optical pressure sensors incorporating photonic crystals.

BACKGROUND OF THE INVENTION

Within the past decade, photonic crystals, also referred to as photonic band gap materials [1], have emerged as a new class of materials and devices providing remarkable capabilities of light control and manipulation. The possibility to modify dynamically the geometrical parameters of the photonic crystal structure makes possible the realization of sensitive optical device and thus the 2D photonic crystal technology extremely attractive for the fabrication of physical sensors [1,2,3,4].

Sensors now play important roles in many applications, including automotive safety, homeland security, environmental monitoring and medical equipment. The interest in micro sensors has dramatically increased during the last decade. Micro-electro-mechanical (MEMS) and micro-opto-electro-mechanical systems (MOEMS) technologies have been considerably developed and the expansion of the application field can be expected to grow both in terms of an academic and commercial interests. Various devices have been reported for improved sensing systems.

There is a need for other properties in sensors which are not yet possible in MEMS devices such as fast response and high sensitivity. Sensors based on optics and integrated optics potentially features configurations without electric wires. The clear advantage is the capability to resist harsh environments, immunity to electromagnetic interference, safety in explosive media, and good sensitivity with high dynamic range [4]. Applying photonic crystals which possess unique dispersion characteristics and photonic bandgap, the sizes of the sensor can be dramatically reduced, approximately over three orders of magnitude less than commercial integrated optical Mach-Zehnder interferometers. The nanoscale dimensions of microscale photonic devices allows the fabrication of low weight, compact, dense, and highly parallel sensors [5].

A step towards the goal of providing a sensitive microscale pressure sensor was provided by Biallo et al. [6], who reported a numerical analysis of waveguide-based photonic crystal pressure sensing device incorporating a microcavity. The principle of operation of the device involved the effect of strain on the refractive index of the structure, which was shown to cause the spectral detuning of the microcavity resonance. All theoretical modelling involved a photonic crystal device suspended in air, neglecting any neighbouring structures that could lead to out-of-plane losses.

While this structure succeeds in theoretically demonstrating sensitivity to pressure, practical limitations likely preclude its application in real-world devices. Firstly, the sensitivity of the device depends on a very high quality factor for the microcavity, which is known to be extremely difficult to achieve in microstructured photonic crystal devices due to limitations in material processing technology. Secondly, the device requires a high spectral resolution for the measurement of pressure, which may limit the range of applications for the device.

SUMMARY OF THE INVENTION

The present invention provides a microscale pressure sensor comprising a bridged device in which a photonic crystal waveguide, surrounded by a photonic crystal slab, is suspended over a dielectric substrate. Under applied pressure, the photonic crystal waveguide is deflected toward the substrate, causing a decrease in optical transmission across the waveguide due to the coupling of the evanescent field of the guided mode to the dielectric substrate. In a preferred embodiment, the waveguide is coupled to a photonic crystal microcavity, which increases evanescent coupling.

Accordingly, in a first aspect, a pressure sensing device is provided comprising: a sensing structure comprising a photonic crystal waveguide cladded by a planar two-dimensional photonic crystal, the photonic crystal waveguide supporting the transmission of a guided mode; first and second waveguides connected to the photonic crystal waveguide to support transmission of the guided mode through the first and second waveguides and the photonic crystal waveguide, wherein the first and second waveguides and the sensing structure are formed from a first dielectric material; the first and second waveguides extending laterally from the sensing structure and contacting dielectric support structures to support the sensing structure above a dielectric substrate and produce a spatial offset between the sensing structure and the dielectric substrate; wherein a dielectric constant of the dielectric support structures is less than a dielectric constant of the first dielectric material; and wherein the first and second waveguides bend under application of pressure to the sensing structure for increasing evanescent field coupling between the photonic crystal waveguide and the dielectric substrate and producing a loss in transmission correlated with the pressure.

The first dielectric material preferably comprises a semiconductor, the dielectric support structures are preferably formed from a second dielectric material provided between the first dielectric material and the dielectric substrate, and more preferably the first dielectric material and the substrate comprise a semiconductor and the second dielectric material comprises an insulator, where the semiconductor preferably comprises silicon and the insulator comprises silicon dioxide. The offset is preferably less than 1 micron.

The sensing structure may also comprise a photonic crystal microcavity optically coupled to the photonic crystal waveguide, where the microcavity is preferably positioned within the two dimensional photonic crystal and adjacent to the photonic crystal waveguide.

The sensing structure may further comprise one or more additional planar segments extending from the planar two dimensional photonic crystal for increasing a sensitivity to applied pressure, and may additionally comprise one or more additional lateral support segments, each the additional lateral support segment connecting the sensing structure to an additional dielectric support structure for further supporting the sensing structure above the dielectric substrate.

The photonic crystal waveguide may comprise one or more bends, where the first and second waveguides are preferably positioned on a common side of the sensing device, wherein the sensing device comprises a cantilever.

The device preferably further comprises an input coupling means for coupling an optical beam to one of the first and second waveguides and an output coupling means for coupling optical power transmitted through the device, where the input coupling means and the output coupling means are preferably selected from the group consisting of optical fiber butt coupling and coupling to an optical fiber supported in a groove.

In another aspect, an integrated device is provided comprising a plurality of pressure sensing devices monolithically integrated onto a common dielectric substrate, where the integrated device may further comprise a planar optical power splitting device comprising an input waveguide and a plurality of output waveguides, wherein each output waveguide is connected to one of the first and second waveguides belonging to one of the plurality of pressure sensing devices, or a planar optical wavelength splitting device comprising an input waveguide and a plurality of output waveguides, wherein each output waveguide is connected to one of a first and second waveguide belonging to one of the plurality of pressure sensing devices.

In yet another aspect, there is provided a pressure sensing system comprising: a photonic crystal pressure sensor comprising a sensing structure comprising a photonic crystal waveguide cladded by a planar two-dimensional photonic crystal, the photonic crystal waveguide supporting the transmission of a guided mode; first and second waveguides connected to the photonic crystal waveguide to support transmission of the guided mode through the first and second waveguides and the photonic crystal waveguide, wherein the first and second waveguides and the sensing structure are formed from a first dielectric material; the first and second waveguides extending laterally from the sensing structure and contacting dielectric support structures to support the sensing structure above a dielectric substrate and produce a spatial offset between the sensing structure and the dielectric substrate; wherein a dielectric constant of the dielectric support structures is less than a dielectric constant of the first dielectric material; wherein the first and second waveguides bend under application of pressure to the sensing structure for increasing evanescent field coupling between the photonic crystal waveguide and the dielectric substrate and producing a loss in transmission correlated with the pressure; an optical source for providing an incident optical beam; an optical detector for detecting power transmitted through the photonic crystal pressure sensor; an input coupling means for coupling the optical beam to one of the first and second waveguides; an output coupling means for coupling optical power transmitted through the device to the optical detector; and a processing means for relating a detected signal to a pressure applied to the sensing device. The system may further comprise a display means.

The system may further comprise a spectrometer for detecting a transmission spectrum of the photonic crystal pressure sensor, and may also comprise one or more additional photonic crystal pressure sensing devices, where the photonic crystal pressure sensing devices are preferably monolithically integrated onto a common dielectric substrate.

In another aspect, there is provided a method of detecting pressure within a fluid using a photonic crystal pressure sensing device, the photonic crystal pressure sensing device comprising: a sensing structure comprising a photonic crystal waveguide cladded by a two-dimensional photonic crystal, the photonic crystal waveguide supporting the transmission of a guided mode; first and second waveguides connected to the photonic crystal waveguide to support transmission of the guided mode through the first and second waveguides and the photonic crystal waveguide; and the first and second waveguides extending laterally from the sensing structure and contacting dielectric support structures to support the sensing structure above a dielectric substrate and produce a spatial offset between the sensing structure and the dielectric substrate; wherein the first and second waveguides bend under application of pressure to the sensing structure for increasing evanescent field coupling between the photonic crystal waveguide and the dielectric substrate and producing a loss in transmission correlated with the pressure; the method comprising the steps of: coupling an incident optical beam the first waveguide; collecting a transmitted light beam from the second waveguide and detecting optical power transmitted through the pressure sensing device; and relating the detected optical power to a pressure applied to the sensing device. Preferably, the step of collecting and detecting optical power transmitted through the pressure sensing device comprises the measurement of a transmission spectrum of the device. The fluid may comprise a compressible fluid or a substantially incompressible fluid.

The device may be calibrated prior to performing a measurement of an unknown pressure, the method further comprising the steps of: applying a series of known pressures to the device and recording a corresponding optical power transmitted through the device for each the known pressure; and generating a relationship between the known pressures and the corresponding optical power values; wherein the step of relating the detected optical power to a pressure applied to the sensing device for an unknown pressure comprises the step of obtaining an inferred pressure value by comparing the detected optical power with the relationship, where the relationship preferably comprises one of a calibration curve and a look-up table.

The steps of coupling an incident optical beam the first waveguide and collecting a transmitted light beam from the second waveguide may be achieved using a coupling means selected from the group consisting of optical fiber butt coupling and coupling to an optical fiber suppored in a groove.

In yet another aspect, there is provided a method of fabricating a photonic crystal pressure sensor, the method comprising the steps of: providing a wafer comprising an upper semiconductor layer, a buried insulator layer and a semiconductor substrate; lithographically processing the upper semiconductor layer to obtain: a photonic crystal waveguide cladded by a two-dimensional photonic crystal, the photonic crystal waveguide supporting the transmission of a guided mode; and first and second waveguides connected to the photonic crystal waveguide to support transmission of the guided mode through the first and second waveguides and the photonic crystal waveguide, wherein the first and second waveguides extend laterally from photonic crystal waveguide; wherein the insulator is exposed adjacent to the two-dimensional photonic crystal, adjacent to the first and second waveguides, and within periodic features of the two-dimensional photonic crystal; lithographically defining a bridge region wherein the insulator is exposed for removal in a subsequent etching step; and etching the exposed insulator to produce a gap beneath the two-dimensional photonic crystal, the photonic crystal waveguide, and a portion of the first and second waveguides.

The step of lithographically processing the semiconductor layer preferably comprises the steps of: coating the semiconductor layer with a layer of electron-beam resist; patterning the resist via electron-beam lithography; and dry etching the semiconductor layer, and the step of dry etching the semiconductor layer is preferably performed using a cryogenic etching process. Alternatively, the step of lithographically processing the semiconductor layer may be performed using one of imprint lithography and deep-UV lithography.

The semiconductor preferably comprises silicon and the insulator comprises silicon dioxide, and the step of etching the exposed insulator comprises the steps of wet etching the silicon dioxide in buffered hydrochloric acid. The photonic crystal pressure sensor is preferably dried in a critical point dryer after wet etching.

A further understanding of the functional and advantageous aspects of the invention can be realized by reference to the following detailed description and drawings.

BRIEF DESCRIPTION OF THE DRAWINGS

The embodiments of the present invention are described with reference to the attached figures, wherein.

DETAILED DESCRIPTION OF THE INVENTION

Generally speaking, the systems described herein are directed to microscale pressure sensor based on photonic crystal devices. As required, embodiments of the present invention are disclosed herein. However, the disclosed embodiments are merely exemplary, and it should be understood that the invention may be embodied in many various and alternative forms. The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to microscale pressure sensors incorporating photonic crystals, and methods of fabricating such devices.

Embodiments of the present invention provide a microscale pressure sensor that is based on measuring transmission modulations through a photonic crystal waveguide. Unlike strain-based photonic crystal pressure sensors known in the art, embodiments of the present invention enable the detection of pressure changes by the measurement of transmission through a photonic crystal waveguide that is moved (due to applied pressure) relative to a dielectric substrate. Variations in the spatial proximity of the waveguide to a dielectric substrate induce variations in the amount of optical power coupled from the evanescent field of the waveguide to the dielectric substrate, thereby decreasing the relative power transmitted through the waveguide. This inventive design enables a higher sensitivity and better tolerance to manufacturing imperfections.

Devices according to embodiments of the present invention may be employed in applications involving the need for microscale pressure measurements, such as microfluidic devices. While capacitive-based devices have been widely used for pressure sensors, the frequency range of such devices makes them highly susceptible to dielectric fluctuations due to the complex dielectric response of many electrolytic substances in the MHz to DC spectral range. In contrast, the photonic crystal pressure sensors disclosed herein overcome this limitation by being only sensitive to dielectric effects in the optical domain, which can provide significant performance advantages.

Figure 1:
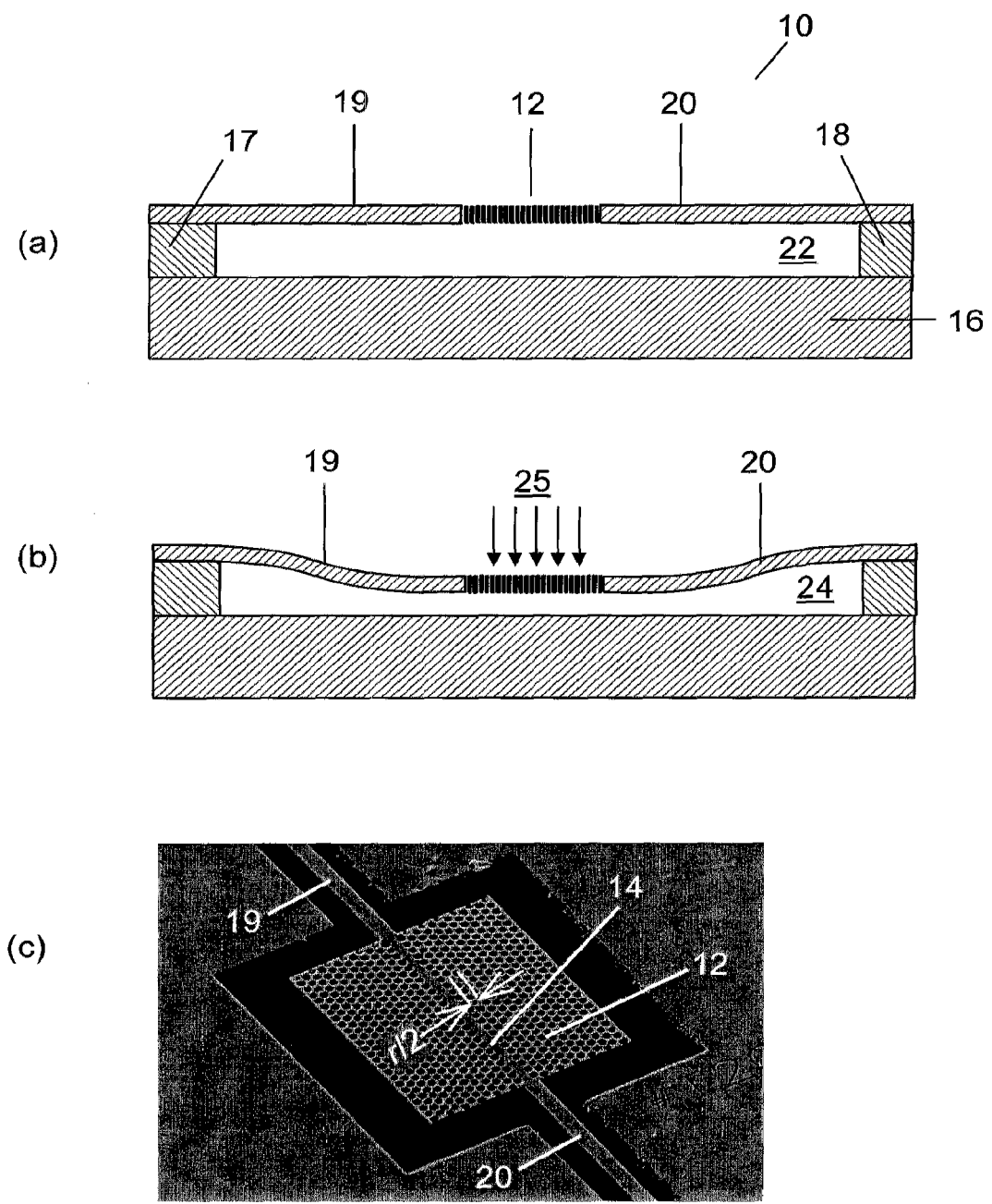
FIG. 1 shows (a) a cross section of the air bridged photonic crystal structure, (b) the cross section of the structure when the pressure causes bending of the top layer, and (c) an SEM view of a fabricated photonic crystal.

A general embodiment of the invention is shown in FIG. 1, which shows a pressure sensing element 10 in the form of bridge structure in which a photonic crystal region 12 is supported above a dielectric substrate 16, where photonic crystal region 12 and substrate 16 are separated by gap 22. As shown in FIG. 1(c), the photonic crystal region 12 comprises photonic crystal waveguide 14 that is cladded laterally by a two-dimensional photonic crystal. The photonic crystal region 12 is preferably substantially parallel to the dielectric substrate 16, but may be oriented at small angles to support manufacturing tolerances and/or torsional effects under applied pressure.

The photonic crystal region 12 is supported by waveguides 19 and 20, which are optically coupled to photonic crystal waveguide 14 and supported by dielectric supports 17 and 18. Dielectric supports 17 and 18 are selected to have a dielectric constant that is less than that of waveguides 19 and 20, so that waveguides 19 and 20 support guided modes when in contact with dielectric supports 17 and 18. In one embodiment, dielectric supports 17 and 18 are formed from a common layer that is locally removed to provide the gap 22 beneath waveguides 19 and 20 and photonic crystal layer 12. In a preferred embodiment, dielectric supports 17 and 18 are formed above substrate 16 by selectively removing (for example, by etching) an intermediate dielectric layer provided on top of substrate 16 and beneath waveguides 19 and 20 and photonic crystal region 12. Preferably, the substrate 16 comprises a semiconductor, and more preferably, substrate 16, photonic crystal region 12 and waveguides 19 and 20 comprise a common semiconductor material.

The device is used to sense pressure as follows. As pressure is applied to the device from above (shown at 25 in FIG. 1(b)), the photonic crystal region 12 and waveguides 19 and 20 deflect towards substrate 16, narrowing gap 24 and inducing the coupling of the evanescent field of the guided waveguide mode to the substrate layer, resulting in reduced optical transmission due to out-of-plane losses to the substrate. Waveguides 19 and 20 have length that allows the deflection of photonic crystal region 12 under applied pressure towards substrate 16.

The incorporation of the photonic crystal structure in the pressure sensing region provides numerous benefits. The presence of the photonic crystal structure adjacent to the photonic crystal waveguide improves mechanical sensitivity of the sensor due to the larger area of the membrane. It also provides flexibility when designing the mechanical structure of the membrane separately from the optical waveguide design. Additionally the photonic crystal waveguide modes can also be tuned around the wavelengths of interest to improve the optical sensitivity in the spectral region of interest. Additionally, the field penetration in a vertical direction can be tailored by varying the parameters of the photonic crystal waveguide (and optional microcavity) while keeping lateral light confinement high. These advantages contrast the restrictive situation of a conventional wire-bridge waveguide, which provides very limited flexibility to design the optical modes, and further suffers from the drawback of poorer sensitivity.

The photonic crystal waveguide supports at least one guided mode below the light line of the device in the dielectric environment in which the device is to be operated. The gap between the photonic crystal waveguide and substrate may be formed in air, or may include any substantially compressible medium or substantially incompressible fluid, provided that waveguide supports a suitable guided mode and sufficient optical power is transmitted through the waveguide in the absence of applied pressure.

In a preferred embodiment, the photonic crystal waveguide is a linear channel formed by removing one linear row of holes in a photonic crystal. In another embodiment, the waveguide may be a coupled-resonator optical waveguide formed within a photonic crystal. The photonic crystal may form a periodic structure or may comprise a quasi-periodic structure. The photonic crystal is preferably linear, but may include curvature or one or more bends. The conventional waveguides may be arranged along a common axis, or may be located along different axes to support curvature or bends in the photonic crystal waveguide.

The waveguide and photonic crystal structure may be formed out of any compatible dielectric medium supporting optical transmission via guided modes. In a preferred embodiment, the device is fabricated from a silicon-on-insulator platform, where the photonic crystal region and waveguides are formed in the silicon layer, and the insulator comprises substrate 16 and supports 17 and 18.

In a preferred embodiment of the invention, a photonic crystal microcavity is included to provide an optical resonance via the resonant coupling of light between the waveguide and the microcavity. The microcavity beneficially increases the penetration of the evanescent field away from the photonic crystal layer, and thereby increases the coupling of the evanescent field with the dielectric substrate. More specifically, the field intensity inside the microcavity is higher than in the waveguide, and hence the vertical field penetration is higher. This improves sensitivity of device to changes in refractive index around the microcavity. Additionally, the spectral peak is also sharper which has advantages when used in a multiplexed array configuration. The spectral peak can be easily tuned by changing the size and shape of the microcavity.

The inclusion of the microcavity adds one or more resonant features to the transmission spectrum of the waveguide. The microcavity is preferably formed by decreasing or increasing the radius of one hole in the photonic crystal cladding, but may include other morphological features, as taught in the prior art.

In one embodiment, a single microcavity is included adjacent to the waveguide. The microcavity may lie in the row of holes immediately adjacent to the waveguide, or may lie in a secondary or tertiary row of holes, provided that sufficient coupling exists between the waveguide and the microcavity. The degree of coupling is dependent on the refractive index contrast and the spatial profile of the mode, as is known in the art. Alternatively, the device may include two or more microcavities.

As discussed above, the pressure sensing element enables the detection of applied pressure by detecting the transmission of optical power through the waveguide and monitoring the transmission at one or more wavelengths. Optical power is coupled into one conventional waveguide, propagates through the photonic crystal waveguide, and is collected from the other conventional waveguide and directed to a detection system such as a power meter or spectrometer.

An optical beam may be coupled into and out of the waveguides in several ways that are known in the art. In one non-limiting embodiment, light is coupled to the waveguide from an optical fiber using a groove and fiber coupling scheme, as shown in Ghiron et al. (M. Ghiron et al., WO Patent 082059, PCT/US2007/000813) and Galan et al. (J. V. Galan, P. Sanchis, G. Sanchez, and J. Marti, Optics Express, vol. 15, pp. 7058-7065, 2007), both of which are herein incorporated by reference in their entirety. Groves are lithographically defined adjacent to the waveguides in order to incorporate single mode fibers for coupling light into and out of the pressure sensor. The fibers can be glued onto the substrate to provide an integrated device. The fibers are then connected to a source and detector on the input and output respectively.

In another non-limited example of a coupling scheme, input and output optical fibers may be butt coupled to the waveguides. This may be achieved where the input output waveguides are tapered toward the die edges. The wafer is thinned and cleaved to expose smooth input and output surfaces facets to the lensed tapered fibers, as shown in Almeida et al. (V. R. Almeida, C. A. Barrios, R. R. Panepucci, and M. Lipson, Nature, vol. 431, no. 7012, pp. 1081-1084, 2004), which is herein incorporated by reference in its entirety. The fibers may then be butt coupled on either ends of the device. Alternatively if bends are incorporated into the photonic crystal waveguide, the fibers could be placed on a common side of the device.

The device may be calibrated by applying a controlled amount of pressure to the device and recording the resulting changes in the transmitted optical power or the transmitted optical spectrum. The calibration data may then be utilized to generate a calibration relationship such as a fitted curve or a look-up table. When subsequently measuring unknown pressures, the calibration relationship may be used to infer a pressure from measured optical transmission data.

FIG. 1(c) shows a SEM micrograph of 2D photonic crystal slab based pressure sensor incorporating both a waveguide and microcavity that was fabricated in a silicon on insulator platform, where the photonic crystal region, waveguides, and substrate are formed in silicon and the dielectric supports are formed from silicon dioxide. An air bridged photonic crystal structure is formed by removing the buried oxide layer beneath the top silicon layer where the photonic crystal was realized, locally exposing the substrate. Alternate materials to the silicon-on-insulator format can include any material with a high refractive index, preferably with a refractive index greater than 3 such as GaAs and InP, which are compatible with MEMS and photonic devices.

The photonic crystal pressure sensor may involve the measurement of transmission at a single wavelength, the difference between transmission values at different wavelengths, or a correlation relating to the overall spectral signature of the device to the applied pressure. In one preferred embodiment in which a microcavity is included, the pressure may be related to the depth of the resonance relative to off-resonance waveguide transmission, whereby the microcavity has a pronounced effect on the response of the sensor.

In another preferred embodiment, a pressure sensing system is provided that further includes an optical source delivering an optical beam, coupling optics for coupling the optical beam to a waveguide of the photonic crystal pressure sensor, collection optics for collecting the optical beam emitted from a waveguide of the pressure sensor, and detector for detecting the collected optical beam. The system may further comprise a spectrometer for detecting spectrally-resolved power. The system preferably additionally comprises a computer or processor for analyzing and/or calibrating the detected power and reporting an inferred pressure. Results are preferably displayed on a display such as a computer monitor or liquid crystal display.

Due to their microscale dimensions, photonic crystal pressure sensors disclosed herein may be incorporated into numerous applications, including microfluidics, medical devices, and remote sensing devices. The optical devices are also especially suited to environments in which traditional electronic-based devices would fail due to electromagnetic interference, or in applications where the risk of explosive detonation is high. Pressure sensing devices as disclosed herein may be used in numerous environments and may be adapted to measure pressures in gas and liquid phases.

The pressure sensing devices may also be included in a system whereby one or more devices are employed to obtain pressure information at multiple spatial locations. In one embodiment, multiple individual sensing devices are operated by a single pressure sensing system. In a preferred embodiment, multiple devices are formed on a single substrate, thereby forming an array enabling the measurement of spatially variations in pressure.

In a preferred embodiment, an array of pressure sensing devices is formed on a single substrate and is fed by a common optical source. The source may be coupled to an input waveguide of a planar optical power splitting device (preferably integrated onto the same substrate), which comprises multiple output waveguides for providing optical power to input waveguides of each pressure sensing device. Alternatively, the pressure sensing devices may each operate at a unique optical wavelength. In such an embodiment, the input waveguides may be spectrally multiplexed to a single multi-wavelength source using a planar wavelength division multiplexing device such as an arrayed waveguide grating.

In another preferred embodiment, optical power sources and detectors are integrated onto the sensing device, forming a miniature integrated module. In a preferred embodiment comprising on-chip light sources and detectors, the device includes an in-line waveguide photodetector fabricated at the output of the waveguides, as demonstrated in Jones et al. (R. Jones, H. D. Park, A. W. Fang, J. E. Bowers, O. Cohen, O. Raday, and M. J. Paniccia, Journal of Materials Science-Materials in Electronics, vol. 20, pp. 3-9, 2009) and Jones-Bay et al. (H. A. Jones-Bey, Laser Focus World, vol. 42, no. 1, p. 38-+, 2006), both of which are herein incorporated by reference in their entirety. To integrate a light source with spectral content compatible with a silicon photonic crystal waveguide, it is preferable to utilize hybrid integration techniques to integrate a III-V material (GaAs or InP) based LED or laser onto the silicon substrate at the input of the sensor, as demonstrated by Kimura et al. (S. Kimura, K. Maio, T. Doi, T. Shimano, and T. Maeda, IEEE Transactions on Electron Devices, pp. 997-1004, 2002) and Knights et al. (A. P. Knights, J. D. B. Bradley, S. H. Gou, and P. E. Jessop, Journal of Vacuum Science & Technology A, vol. 24, pp. 783-786, 2006), both of which are herein incorporated by reference in their entirety. Alternatively, organic LEDs or silicon light could be integrated with the input waveguides to provide an on-chip optical source.

The relationship between the mechanical displacement of the sensor and applied pressure may be established using atomic force microscopy and/or mechanical modelling. After fabrication, atomic force microscopy may be used to test the mechanical response of the pressure sensor. Mechanical modelling of the photonic crystal pressure sensor may be performed using the finite element method.

Optical modeling of the device may be achieved using 3D finite difference time domain methods. Including such modelling steps in the design of a microscale pressure sensor permits detailed analysis of the expected sensor properties prior to fabrication.

Figure 2:
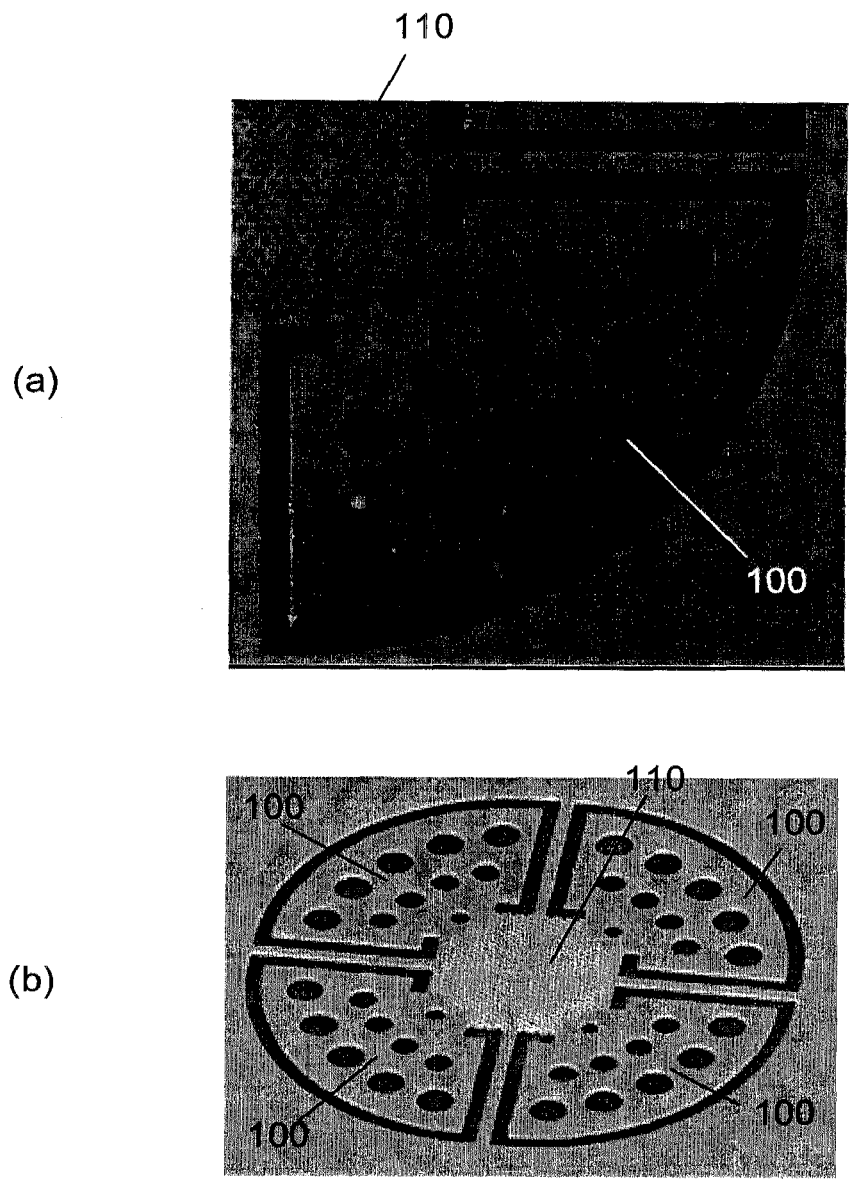
FIGS. 2(a) and 2(b) show an overhead view of an improved photonic crystal pressure sensor design incorporating a larger suspended region.

In a preferred embodiment, the sensitivity of the device is enhanced by increasing the surface area of the photonic crystal region and/or by adding additional planar structure adjacent to the photonic crystal region. FIGS. 2(a) and 2(b) show an alternative embodiment with the same optical waveguide geometry as in the previous example, but also incorporating four planar segments 100 extending from the central photonic crystal region 110. The segments increase the sensitivity of the device by increasing surface area by a large factor. The planar segments also include openings to facilitate the formation of a gap during etching. While the two conventional waveguides couple the device to an external support, two additional supporting connections can be seen in FIG. 2. These additional connections can be optionally included to provide additional mechanical stability to the device.

While the aforementioned modelling focused on understanding the effect of applied forces on the physical response of the device, further mechanical characterization methods are also contemplated by other embodiments of the invention. In one embodiment, the response of the sensor to torsion may be determined by experimentally or numerically modelling the effect of torsion on the optical spectrum of the waveguide. In another embodiment, modelling may include the effect of stress on the refractive index of the device, which, depending on the optical properties of the material system, may result in detuning the microcavity resonance. This additional detuning mechanism, coupled with the overall dependence of the transmission on the gap distance, could potentially add to the sensitivity of the device.

In another embodiment, the photonic crystal sensor may include electrical contacts enabling the application of an electric field for control or stabilization of the sensor or alternatively for capacitive monitoring of the sensor. In one embodiment, the substrate could comprise a doped semiconductor with an external contact pad, and the top layer could be electrically insulated from the conductive substrate by insulating vertical standoffs or an insulating layer in an external planar support. Individual electrodes could be applied to various locations on the upper layer, and the contacts could be connected to external contact pads by conductive paths extending along additional structures supporting the upper layer.

In the aforementioned embodiment of the sensor, the upper layer of the device includes a central region comprising a photonic crystal incorporating a photonic crystal waveguide (with or without a microcavity coupled to the waveguide), with a conventional waveguides emerging from either end of the photonic crystal waveguide and connecting the upper layer to a support structure such as a vertical standoff. In a preferred embodiment, one or more additional planar segments are connected to the photonic crystal region to increase the effective surface area, and hence the sensitivity, of the sensor. Preferably, the additional planar segments are symmetrically disposed relative to the axis of the waveguide and an axis bisecting the waveguide and lying in the plane of the device.

The additional segments may also include structures for providing additional connections to support structures. The additional segments forming additional connections improve the sensor performance by enabling narrowed support lines that maximize coupling to the photonic crystal, which also increases mechanical sensitivity. Furthermore, by disposing the additional connections with suitable symmetry with regard to the waveguide, the movement of the photonic crystal waveguide can be engineered to be more uniform with pressure. The additional connections may also be used to create desirable torsional modes of the device.

The additional planar segments may include one or more openings to assist in the formation of the gap during etching. The one or more openings may comprise an extension of the photonic crystal region or may be larger individual holes.

The photonic crystal waveguide may comprise one or more bends to further improve the sensitivity of the pressure sensor. In a preferred embodiment, the waveguide comprises two bends, whereby the incident power is redirected in a backwards direction. Accordingly, the waveguides coupled to the photonic crystal waveguide reside on a common side of the photonic crystal region, thus enabling the photonic crystal region to be cantilevered over the gap.

The following examples are presented to enable those skilled in the art to understand and to practice the present invention. They should not be considered as a limitation on the scope of the invention, but merely as being illustrative and representative thereof.

EXAMPLES

Example 1

Fabrication of Device in Silicon-on-Insulator Wafer

Devices according to a preferred embodiment of the invention are preferably fabricated as follows. The top pattern of device, including the photonic crystal region and conventional waveguides, is created onto silicon-on-insulator (SOI) wafers via electron beam lithography. The SOI wafers, typically 4" or 6" in diameter, may be purchased from a commercial supplier and diced to 1.5 cm×1.5 cm square wafer pieces. A 200 nm thick uniform layer of e-beam resist (ZEP520A) is coated on the wafer. Standard electron beam lithography is used to write the photonic crystal pattern in the resist. The resist pattern is developed and then transferred onto the device layer, Silicon, by inductively coupled plasma etching, also known as dry etching. To obtain smooth sidewalls in the holes, cryogenic dry etch process is used. The Bosch process can also be used to etch the holes but will have more roughness which can affect the waveguide loss. The cryogenic etch process recipe for shallow height (<1 micron) Silicon was developed locally.

After dry-etching of the pattern, a second lithography step is employed to define the area for wet etching of the oxide layer as only within the bridge area under the photonic crystal region and a portion of the waveguides. This enables the outer portion of the waveguides to contact and be supported by the dielectric supports, as shown in FIG. 1. The final step is to remove the oxide under the photonic crystal membrane and release the air bridge, which is done by wet etching of the device in buffered hydrofluoric acid. This is an isotropic etch and the air-holes allow the acid to penetrate underneath and etch away the oxide isotropically. Finally the samples are dried using a critical point dryer to prevent the membranes from collapsing due to surface tension effects.

For large scale device manufacturing, imprint lithography or deep-UV lithography may be used instead of electron beam lithography.

Example 2

Optical Modelling of Line Defect

A line defect photonic crystal waveguide was modelled with broad transmission bandwidth from 1.23 µm to 1.53 µm and high transmission coefficient of over 80%. Transmission was measured between the conventional output to input waveguides of the suspended bridge. The polarization was TM (Electric field parallel to the photonic crystal slab). The lattice type was hexagonal with a lattice constant of 400 nm and a hole diameter of 280 nm. The geometrical parameters of the bridge were as follows: slab thickness=300 nm, bridge width=1300 nm, bridge length=20 µm (along the propagation direction) and the best conventional waveguide width that minimizes coupling loss to the photonic crystal section was found to be 800 nm.

By inserting a microcavity next to the photonic crystal waveguide (highlighted as r/2 in FIG. 1(c)), strong coupling occurs between the photonic crystal waveguide and the cavity near resonance frequency that taps some of the propagating power. The transmission level as well as the position of the resonance dip can efficiently be tuned by varying the cavity hole size. (Note that the centre of the cavity is preferably fixed at the corresponding lattice point).

Figure 3:
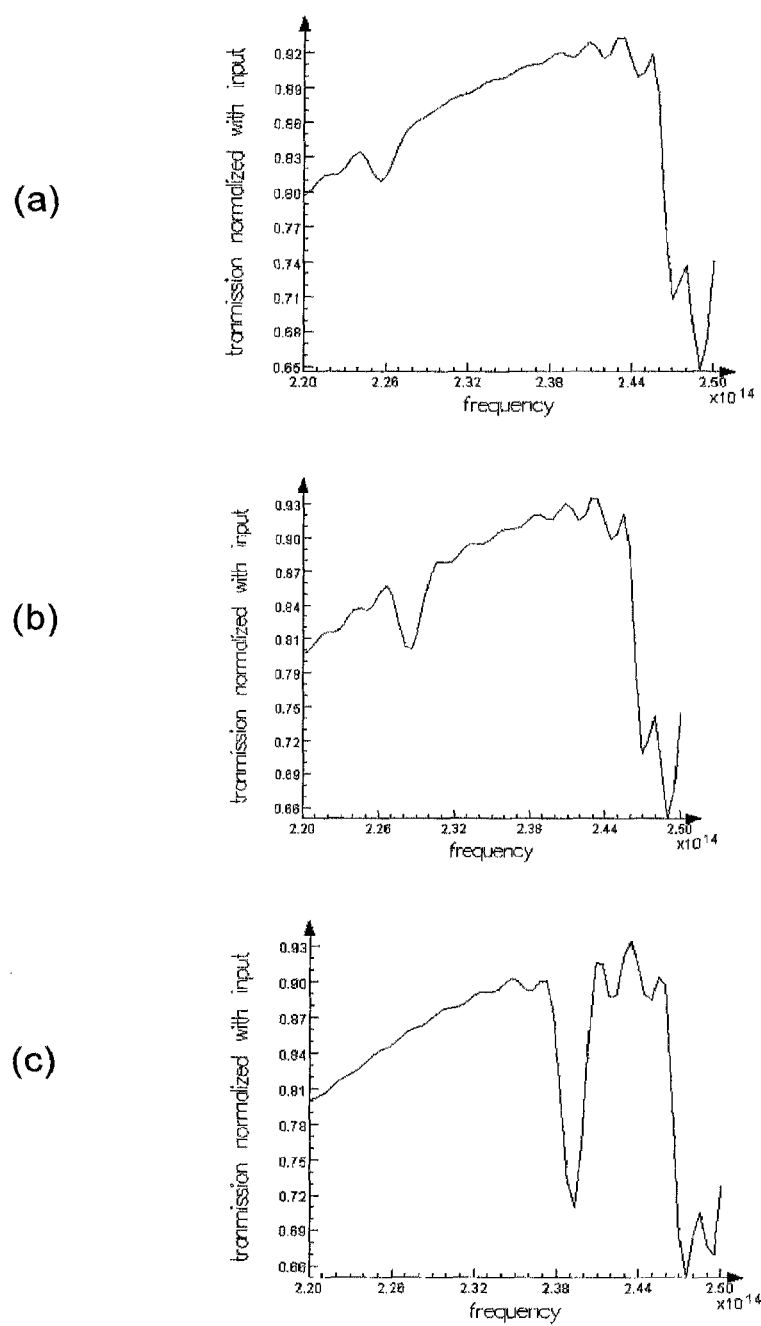
FIG. 3 shows (a) transmission spectra when the size of the microcavity is r/4, where a dip is located at f=226 THz or at $\lambda$=1.32 µm, (b) when the size of the microcavity is r/3, where the dip is located at f=228 THz or at $\lambda$=1.315 µm, and (c) when the size of the microcavity r/2, where the dip is located at f=239 THz or at $\lambda$=1.25 µm.

FIG. 3 shows the transmission spectrum of photonic crystal waveguide with a microcavity having different hole sizes. As the cavity size increases, the depth of the resonance in the transmission spectrum of the device increases. However, the depth of the resonance varies from 3% to 6%, and then to 20% when the size of the cavity varies from r/4 to r/3 and then to r/2, respectively (where r is the hole radius of the bulk photonic crystal).

Figure 4:
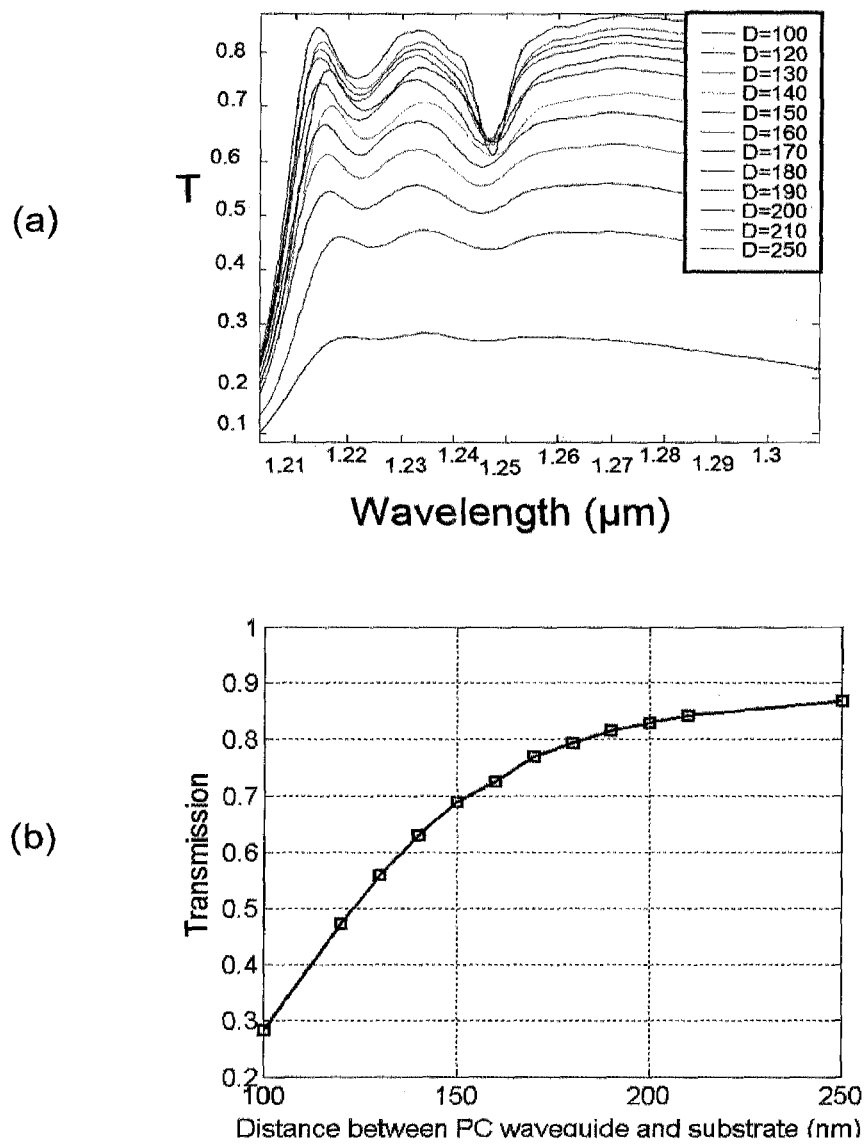
FIG. 4 shows (a) transmission versus wavelength when the gap distance varies from 100 nm to 250 nm, and (b) the peak transmission as a function of the gap distance.

FIG. 4(a) shows transmission spectrum when the gap between the top silicon layer and the substrate varies from 100 to 250 nm. This gap size not only influences the transmission profile but also affects the depth of the resonance. FIG. 4(b) shows the peak transmission as a function of gap distance. As can be seen the normalized transmission varies when the gap distance varies between 120 to 220 nm. The slope of the sensor response is 0.64% for 1 nm change of the gap displacement at the sensitive region. Compared to a similar device without a microcavity, the slope of the integrated microcavity and waveguide device showed an increase in excess of 100%. These results reveal that the pressure sensor has superior performance over prior art photonic crystal pressure sensors relying on refractive index changes mediated by stress alone.

Example 3

Mechanical Modelling of Line Defect

In addition to the optical modelling of the photonic crystal structure, it is useful to relate the optical performance to the mechanical response of the photonic crystal pressure sensor. The measurement of mechanical properties of photonic crystal devices is often challenging due to the miniaturized structure and need for accurate force control.

In order to perform a physical characterization relating the effect of forces applied at different points on the sensor to the spectral response of the sensor, a sufficiently small and precise tool is required. Considering the small size of the photonic crystal materials, the source of the force could be of sharp shape, such as the tip of an atomic force microscope or atomic force microscope cantilever.

Atomic force microscopes can be operated in air, different gases, vacuum, or liquid [8]. Force volume mode is used to acquire the curves of applied force vs. vertical distance for each point corresponding to a pixel of the image. In the force volume mode, the tip is scanned not only along the surface, but travels also in the Z-direction perpendicular to the surface. From the array of force-distance curves the spatial variation of interactions all through the surface of the sample can be shown. In force volume mode, the image was meshed into point array.

Figure 5:
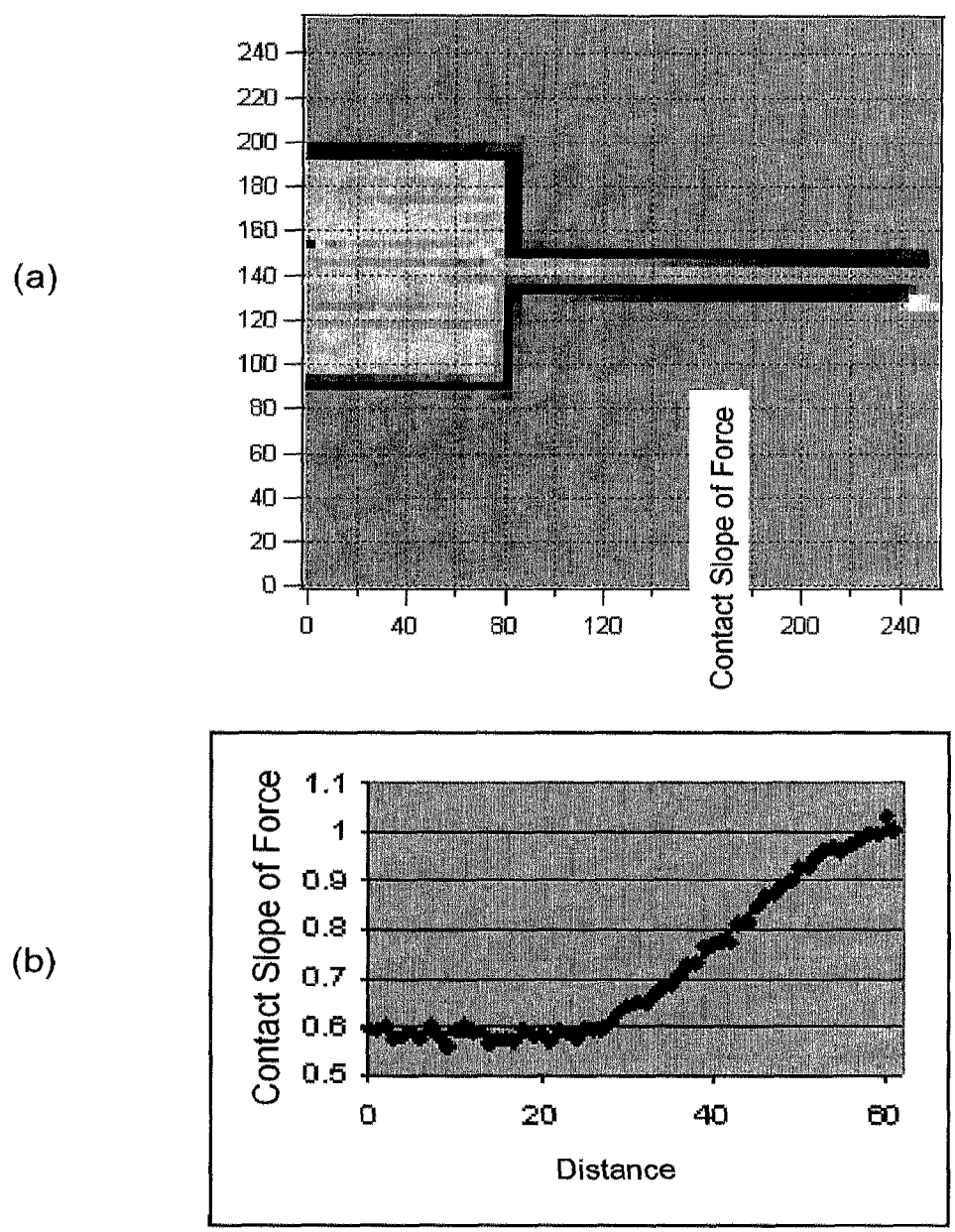
FIG. 5 shows (a) an atomic force microscope image of the pressure sensor, measured in "force-volume" mode and (b) the contact slope of force curves measured in force-volume mode as a function of location along the sensor.

FIG. 5(a) shows the surface topography of a pressure sensor as acquired in force volume mode. FIG. 5(b) shows the slope of force vs. distance curves acquired along the waveguide, normalized to the slope on the rigid supports, for the device according to the present example. The lower slope at the center of the device indicates the region of maximum sensitivity.

Figure 6:
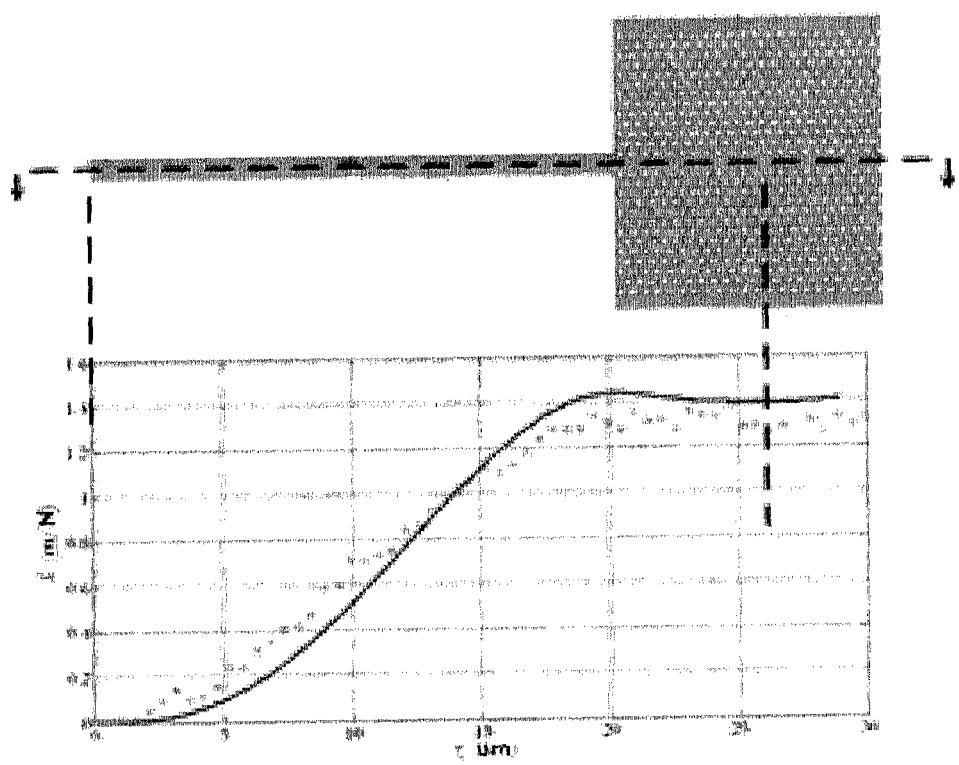
FIG. 6 plots the stiffness constant calculated for the pressure sensor both from atomic force microscope data (circles) and mechanical modelling via the finite element method (smooth curve) as a function of position.

In addition to physical characterization, mechanical modelling of the sensor was performed using the finite element method. Applying pressure over the surface of the bridge, the simulation results show that the photonic crystal almost remains flat when the pressure was applied. Good agreement between AFM results and the mechanical modelling validated the model. The maximum stiffness constant of around 1.40 m/N appears at the centre of the photonic crystal (FIG. 6). The sensitivity is 73 pm membrane displacement under 1 MPa of applied pressure. According to the sensitivity calculations from optical modelling in finite difference time domain calculations, the maximum transmittance pressure sensitivity is approximately 0.046% per 1 MPa.

Figure 7:
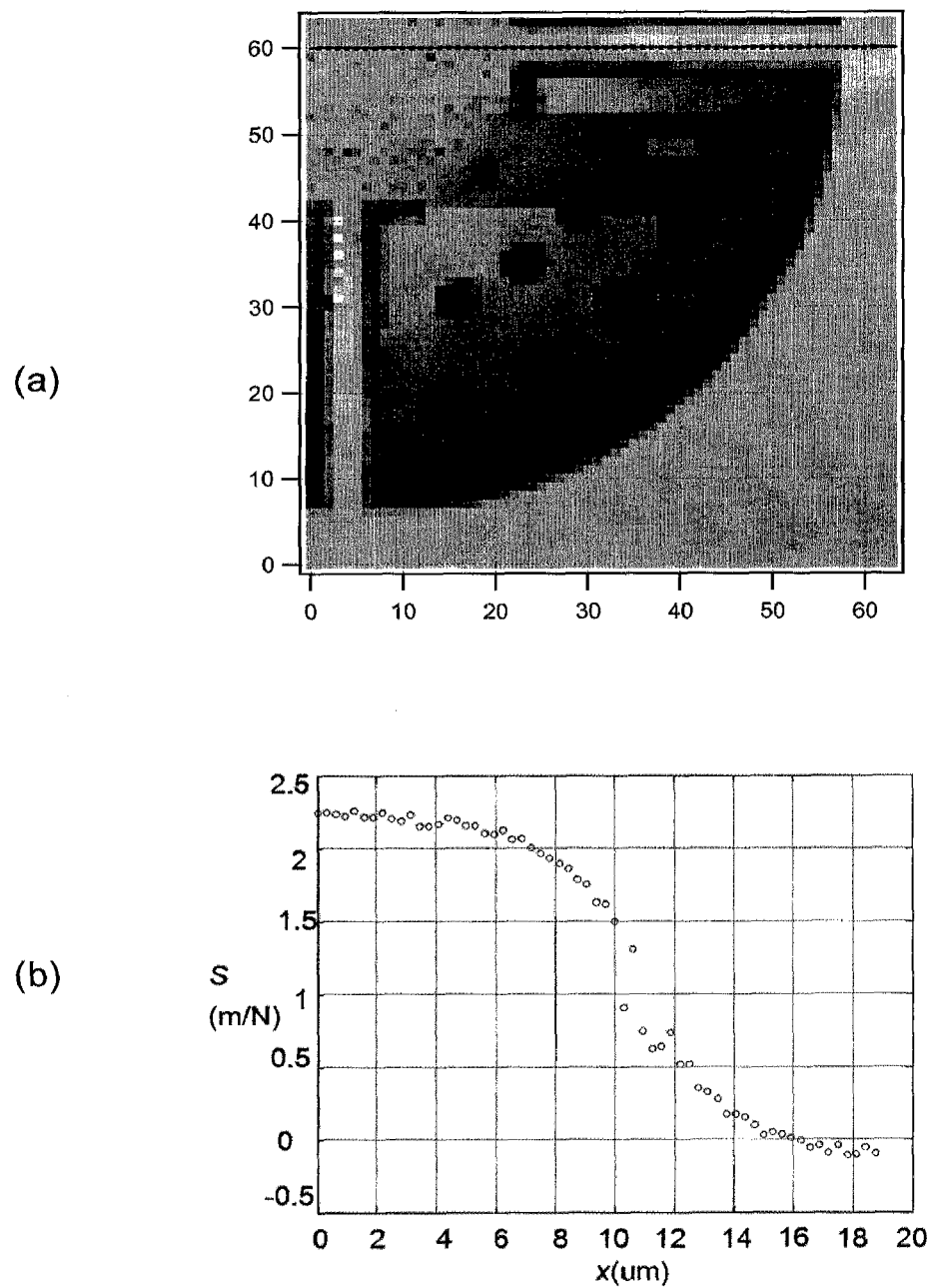
FIG. 7(a) shows a section of the improved pressure sensor and FIG. 7(b) plots the stiffness calculated along the red line in FIG. 7(a).

Modelling of the alternative device structure (shown in FIG. 2) was also performed. As shown in FIG. 7(b), the stiffness constant of the new sensor was increased from 1.4 m/N to 2.4 m/N. Based on the increase in area, the sensitivity is expected to be 10 times higher than device shown in the previous example. The sensitivity of the pressure sensor can be tuned by the varying the size of the upper layer.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

References

1. J. D. Joannopoulos, R. D. Meade and J. N. Winn, "Photonic Crystals: Molding the Flow of Light", Princeton University Press, New York, 1995.
2. E. Yablonovitch, "Inhibited spontaneous emission in solid-state physics and electronics," Phys. Rev. Lett., vol. 58, pp. 2059-2062, 1987.
3. S. John, "Strong localization of photons in certain disordered dielectric superlattices," Phys. Rev. Lett., vol. 58, pp. 2486-2489, 1987.
4. D. Biallo, A. D'Orazio, M. De Sario, V. Marocco, V. Petruzzelli, "Photonic crystal sensors", Mo. D2.1, ICTON 2006.
5. Zhongbing Lu, Xin Xu, Xinli Hu, Guangshuo Zhu, Ping Zhang, Elza D. van Deel, Joel, P. French, John T. Fassett, Tim D. Oury, Robert J. Bache and Yingjie Chen, "Overload Induced Left Ventricular Hypertrophy and Dysfunction Extracellular Superoxide Dismutase Deficiency Exacerbates Pressure", Hypertension 2008; 51; 1925.
6. D. Bialo, M. De Sario, A. D'Orazio, V. Marrocco, V. Petruzzelli, M. A. Vincenti, F. Prudenzano, T. Stomeo, M. Grande, G. Visiberga, R. Cingolani and M. De Vittorio, "High Sensitivity Photonic Crystal Pressure Sensor", Journal of the European Optical Society—Rapid Communications 2, 07017, 2007.
7. D. W. Prather, S. Shi, J. Murakowski, G. J. Schneider, A. Sharkawy, C. Chen, B. Miao, "Photonic crystal structures and applications: perspective, overview, and development", IEEE journal of selected topics in quantum electronics, Vol. 12, No. 6, November/December 2006.
8. F. G. Giessibl, "Advances in atomic force microscopy," Reviews of Modern Physics, vol. 75, no. 3, pp. 949-983, July 2003.
9. M. Ghiron, et al. "Wideband Optical Coupling into Thin SOI CMOS Photonic Integrated Circuit" WO Patent 082059, PCT/US2007/000813. January 2007.
10. J. V. Galan, P. Sanchis, G. Sanchez, and J. Marti, "Polarization insensitive low-loss coupling technique between SOI waveguides and high mode field diameter single-mode fibers," Optics Express, vol. 15, no. 11, pp. 7058-7065, May 2007.
11. V. R. Almeida, C. A. Barrios, R. R. Panepucci, and M. Lipson, "All-optical control of light on a silicon chip," Nature, vol. 431, no. 7012, pp. 1081-1084, Oct. 2004.
12. R. Jones, H. D. Park, A. W. Fang, J. E. Bowers, O. Cohen, O. Raday, and M. J. Paniccia, "Hybrid silicon integration," Journal of Materials Science-Materials in Electronics, vol. 20, pp. 3-9, Jan. 2009.
13. H. A. Jones-Bey, "Optoelectronic integration—Hybrid laser combines III-V gain with silicon waveguide," Laser Focus World, vol. 42, no. 1, p. 38-+, Jan. 2006.
14. S. Kimura, K. Maio, T. Doi, T. Shimano, and T. Maeda, "Photodetectors monolithically integrated on SOI substrate for optical pickup using blue or near-infrared semiconductor laser," Ieee Transactions on Electron Devices, vol. 49, no. 6, pp. 997-1004, June 2002.
15. A. P. Knights, J. D. B. Bradley, S. H. Gou, and P. E. Jessop, "Silicon-on-insulator waveguide photodetector with self-ion-implantation-engineered-enhanced infrared response," Journal of Vacuum Science & Technology A, vol. 24, no. 3, pp. 783-786, May 2006.

Therefore what is claimed is:

1. A pressure sensing device comprising:
   a sensing structure comprising a photonic crystal waveguide cladded by a planar two-dimensional photonic crystal, said photonic crystal waveguide supporting the transmission of a guided mode;
   first and second waveguides connected to said photonic crystal waveguide to support transmission of said guided mode through said first and second waveguides and said photonic crystal waveguide, wherein said first and second waveguides and said sensing structure are formed from a first dielectric material;
said first and second waveguides extending laterally from said sensing structure and contacting dielectric support structures to support said sensing structure above a dielectric substrate and produce a spatial offset between said sensing structure and said dielectric substrate;
wherein a dielectric constant of said dielectric support structures is less than a dielectric constant of said first dielectric material; and
wherein said first and second waveguides bend under application of pressure to said sensing structure for increasing evanescent field coupling between said photonic crystal waveguide and said dielectric substrate and producing a loss in transmission correlated with said pressure.

2. The device according to claim 1 wherein said first dielectric material comprises a semiconductor.

3. The device according to claim 1 wherein said dielectric support structures are formed from a second dielectric material provided between said first dielectric material and said dielectric substrate.

4. The device according to claim 1 wherein said first dielectric material and said substrate comprise a semiconductor and said second dielectric material comprises an insulator.

5. The device according to claim 4 wherein said semiconductor comprises silicon and said insulator comprises silicon dioxide.

6. The device according to claim 1 wherein said sensing structure further comprises a photonic crystal microcavity optically coupled to said photonic crystal waveguide.

7. The device according to claim 6 wherein said microcavity is positioned within said planar two dimensional photonic crystal and adjacent to said photonic crystal waveguide.

8. The device according to claim 1 wherein said sensing structure further comprises one or more additional planar segments extending from said planar two dimensional photonic crystal for increasing a sensitivity to applied pressure.

9. The device according to claim 1 wherein said sensing structure further comprises one or more additional lateral support segments, each said additional lateral support segment connecting said sensing structure to an additional dielectric support structure for further supporting said sensing structure above said dielectric substrate.

10. The device according to claim 1 wherein said photonic crystal waveguide comprises one or more bends.

11. The device according to claim 10 wherein said first and second waveguides are positioned on a common side of said sensing device, wherein said sensing device comprises a cantilever.

12. The device according to claim 1 further comprising an input coupling means for coupling an optical beam to one of said first and second waveguides and an output coupling means for coupling optical power transmitted through said device.

13. The device according to claim 12 wherein said input coupling means and said output coupling means are selected from the group consisting of optical fiber butt coupling and coupling to an optical fiber supported in a groove.

14. The device according to claim 1 wherein said offset is less than 1 micron.

15. An apparatus comprising a plurality of pressure sensing devices according to claim 1, wherein said pressure sensing devices are monolithically integrated onto a common dielectric substrate.

16. The apparatus according to claim 15 further comprising a planar optical power splitting device comprising an input waveguide and a plurality of output waveguides, wherein each output waveguide is connected to one of said first and second waveguides belonging to one of said plurality of pressure sensing devices.

17. The apparatus according to claim 15 further comprising a planar optical wavelength splitting device comprising an input waveguide and a plurality of output waveguides, wherein each output waveguide is connected to one of a first and second waveguide belonging to one of said plurality of pressure sensing devices.

18. A pressure sensing system comprising:
a photonic crystal pressure sensor comprising:
a sensing structure comprising a photonic crystal waveguide cladded by a planar two-dimensional photonic crystal, said photonic crystal waveguide supporting the transmission of a guided mode;
first and second waveguides connected to said photonic crystal waveguide to support transmission of said guided mode through said first and second waveguides and said photonic crystal waveguide, wherein said first and second waveguides and said sensing structure are formed from a first dielectric material;
said first and second waveguides extending laterally from said sensing structure and contacting dielectric support structures to support said sensing structure above a dielectric substrate and produce a spatial offset between said sensing structure and said dielectric substrate;
wherein a dielectric constant of said dielectric support structures is less than a dielectric constant of said first dielectric material;
wherein said first and second waveguides bend under application of pressure to said sensing structure for increasing evanescent field coupling between said photonic crystal waveguide and said dielectric substrate and producing a loss in transmission correlated with said pressure;
an optical source for providing an incident optical beam;
an optical detector for detecting power transmitted through said photonic crystal pressure sensor;
an input coupling means for coupling said optical beam to one of said first and second waveguides;
an output coupling means for coupling optical power transmitted through said device to said optical detector; and
a processing means for relating a detected signal to a pressure applied to said sensing device.

19. The system according to claim 18 further comprising a spectrometer for detecting a transmission spectrum of said photonic crystal pressure sensor.

20. The system according to claim 18 further comprising one or more additional photonic crystal pressure sensing devices.

21. The system according to claim 20 wherein said photonic crystal pressure sensing devices are monolithically integrated onto a common dielectric substrate.

22. The system according to claim 18 further comprising a display means.

23. A method of detecting pressure within a fluid using a photonic crystal pressure sensing device, said photonic crystal pressure sensing device comprising:
a sensing structure comprising a photonic crystal waveguide cladded by a two-transmission dimensional photonic crystal, said photonic crystal waveguide supporting the of a guided mode;
first and second waveguides connected to said photonic crystal waveguide to support transmission of said guided mode through said first and second waveguides and said photonic crystal waveguide; and said first and second waveguides extending laterally from said sensing structure and contacting dielectric support structures to support said sensing structure above a dielectric substrate and produce a spatial offset between said sensing structure and said dielectric substrate;

wherein said first and second waveguides bend under application of pressure to said sensing structure for increasing evanescent field coupling between said photonic crystal waveguide and said dielectric substrate and producing a loss in transmission correlated with said pressure;

said method comprising the steps of:

coupling an incident optical beam said first waveguide;

collecting a transmitted light beam from said second waveguide and detecting optical power transmitted through said pressure sensing device; and relating said detected optical power to a pressure applied to said sensing device.

24. The method according to claim 23 wherein said device is calibrated prior to performing a measurement of an unknown pressure, said method further comprising the steps of:

applying a series of known pressures to said device and recording a corresponding optical power transmitted through said device for each said known pressure; and generating a relationship between said known pressures and said corresponding optical power values;

wherein said step of relating said detected optical power to a pressure applied to said sensing device for an unknown pressure comprises the step of obtaining an inferred pressure value by comparing said detected optical power with said relationship.

25. The method according to claim 24 wherein said relationship comprises one of a calibration curve and a look-up table.

26. The method according to claim 23 wherein said step of collecting and detecting optical power transmitted through said pressure sensing device comprises the measurement of a transmission spectrum of said device.

27. The method according to claim 23 wherein said fluid comprises a compressible fluid.

28. The method according to claim 23 wherein said fluid comprises a substantially incompressible fluid.

29. The method according to claim 23 wherein said steps of coupling an incident optical beam said first waveguide and collecting a transmitted light beam from said second waveguide are achieved using a coupling means selected from the group consisting of optical fiber butt coupling and coupling to an optical fiber supported in a groove.

30. A method of fabricating a photonic crystal pressure sensor, said method comprising the steps of:

providing a wafer comprising an upper semiconductor layer, a buried insulator layer and a semiconductor substrate;

lithographically processing said upper semiconductor layer to obtain:

a photonic crystal waveguide cladded by a two-dimensional photonic crystal, said photonic crystal waveguide supporting the transmission of a guided mode; and first and second waveguides connected to said photonic crystal waveguide to support transmission of said guided mode through said first and second waveguides and said photonic crystal waveguide, wherein said first and second waveguides extend laterally from photonic crystal waveguide;

wherein said insulator layer is exposed adjacent to said two-dimensional photonic crystal, adjacent to said first and second waveguides, and within periodic features of said two-dimensional photonic crystal;

lithographically defining a bridge region wherein said insulator layer is exposed for removal in a subsequent etching step; and etching said exposed insulator layer to produce a gap beneath said two-dimensional photonic crystal, said photonic crystal waveguide, and a portion of said first and second waveguides.

31. The method according to claim 30 wherein said step of lithographically processing said semiconductor layer comprises the steps of:

coating said semiconductor layer with a layer of electron-beam resist;

patterning said resist via electron-beam lithography; and dry etching said semiconductor layer.

32. The method according to claim 31 wherein said step of dry etching said semiconductor layer is performed using a cryogenic etching process.

33. The method according to claim 30 wherein said step of lithographically processing said semiconductor layer is performed using one of imprint lithography and deep-UV lithography.

34. The method according to claim 30 wherein said semiconductor comprises silicon and said insulator comprises silicon dioxide.

35. The method according to claim 34 wherein said step of etching said exposed insulator layer comprises the steps of wet etching said silicon dioxide in buffered hydrochloric acid.

36. The method according to claim 35 further comprising the step of drying said photonic crystal pressure sensor in a critical point dryer.

* * * * *